Figure 1A:
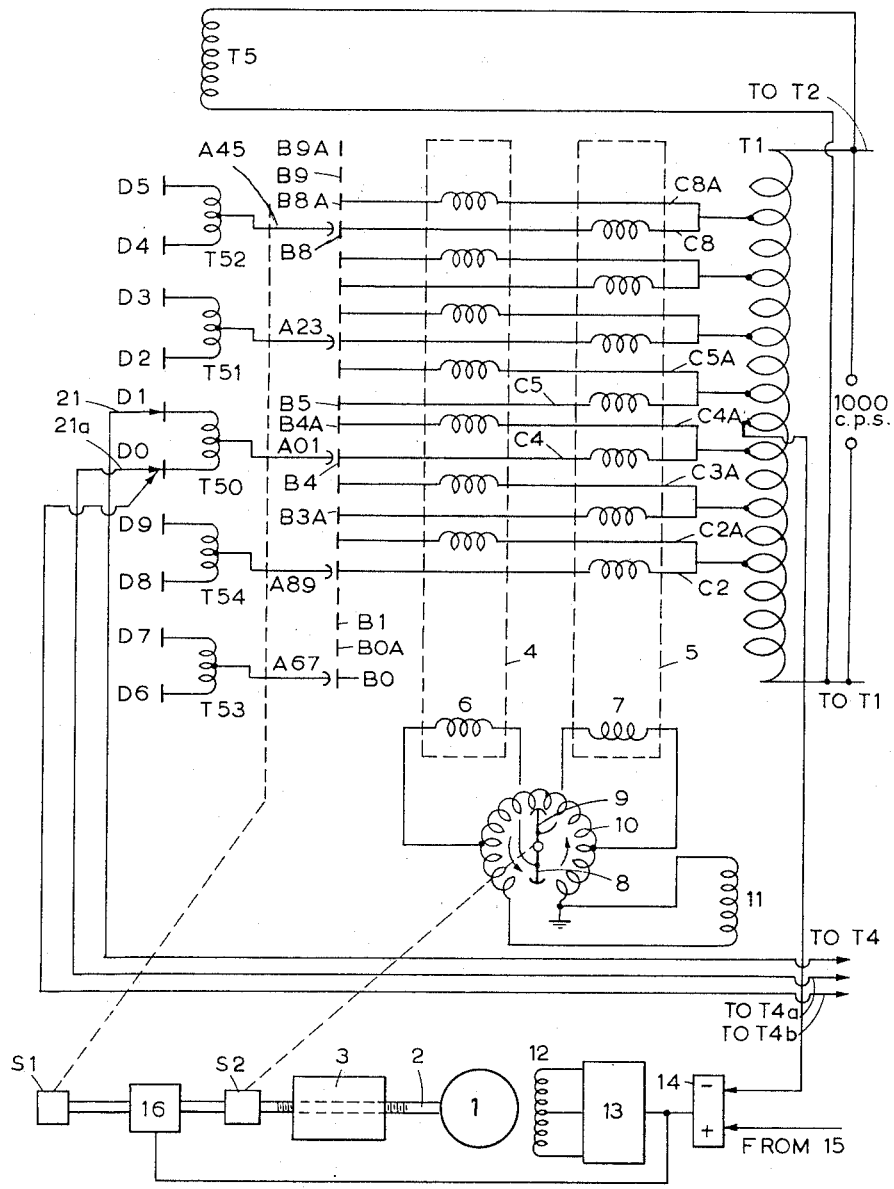

United States Patent Office 3,004,200
Patented Oct. 10, 1961

3,004,200
SERVOMOTOR CONTROL SYSTEM ESPECIALLY FOR MACHINE TOOLS
James Hugh Phillips, Cookham, England, assignor to Electric & Musical Industries Limited, Hayes, Middlesex, England, a company of Great Britain
Filed Apr. 30, 1959, Ser. No. 810,121
Claims priority, application Great Britain May 3, 1958
7 Claims. (Cl. 318—28)

This invention relates to automatic control systems, especially for machine tools.

In a proposed form of automatic control system for machine tools, signals are derived from a tape or other record and represent values of one co-ordinate at discrete reference points on a desired locus for the tool of the machine. From these derived signals a continuously variable electrical command signal is produced by interpolation and the command signal forms one input to servo means which are arranged to displace the tool or work carrier in the respective co-ordinate direction. A position analogue unit is moreover arranged to set up an electrical signal representing the displacement imparted by the servo means and this signal applied as feedback to the servo means forms a second input thereto, the servo-means operating in known manner to tend to maintain equality between the command and feedback signals.

An automatic control system of the kind described in the preceding paragraph is usually required to work with a high degree of accuracy and accuracies exceeding one part in 10,000 may be required. One method of obtaining a high accuracy is to arrange that the digital voltages which are summed to produce the analogue voltages are as large as possible. In other words, the voltage range covered by the highest denominational order used in building up the analogue voltages has to be large so as to allow many subdivisions of this voltage range corresponding to digits of lower orders. However, there is a practical limit for the voltage range for the highest denominational order. A further increase in accuracy can be achieved by omitting the highest order digit or digits of the command and feedback signals provided that these digits change by only one unit during any period when the same reference points are in use. However, this expedient gives rise to a difficulty because, in the command or feedback signal, there is a jump in the value of the highest order retained digit from one extreme to the other each time an omitted digit changes value. Moreover, because of the existence of an error, a jump in the feedback signal may occur at a different time from a jump in the command signal, so that there may be intolerable discontinuity in the error signal.

In the specification of co-pending United States patent application Serial No. 753,793, filed August 7, 1958 by R. E. Spencer and myself there is described an automatic control system which has the object of reducing the difficulties indicated in the preceding paragraph. The control system described in the aforesaid specification comprises an automatic control system comprising a part whose displacement is to be controlled, a servo motor for producing displacement of said part, a voltage divider tapped at a series of reference points, a series of contacts connected respectively to said reference points, an error signal lead for applying a signal to said servo motor, differential switching means for connecting said lead to one of said contacts, said differential switching means comprising command means for switching said lead from one of said contacts to another to represent a desired displacement of said part, feedback means for switching said lead from one of said contacts to another in response to displacement of said part, said servo motor being responsive to the signal from said lead to tend to displace said part and said feedback means being responsive to displacement of said part in the sense tending to counteract the switching of said lead produced by said command means.

In the construction of the differential switching means described in the aforesaid specification, the error signal lead is connected to the wiper of a first multi-position switch which comprises the command means and each contact of that switch is connected to the wiper of a further series of multi-position switches, which comprises the feedback means. The contacts of the latter switches are connected to the reference points on the voltage divider, the order of connection being changed in cyclic manner from switch to switch of the series. The first multi-position switch can be preset to represent the command signal and the wipers of the further series of multi-position switches are ganged to move in response to the displacement of the controlled part so that the effect can be produced of rotating the contacts of the first multi-position switch backward, with respect to the reference points, as the displacement of the controlled part approaches that represented by the command signal. Although this construction for the selector switch is satisfactory in practice, it involves a large number of multi-position switches and the object of the present invention is to reduce the complexity of the selector switch, by avoiding the need to provide one further multi-position switch for every contact of the multi-position switch used to represent the command signal.

According to the present invention there is provided an automatic control system comprising a part the displacement of which is to be controlled, a servo motor for producing displacement of said part, a voltage divider tapped at a series of reference points, a first series of contacts connected respectively to said reference points, feedback switch means including at least one selector movable in response to displacement of said part from one to another of said first series of contacts to derive voltage therefrom, a second series of contacts having circuit connections to said first switching means to maintain different voltages at the successive contacts of said second series determined by the circuit connections and by the switch means, said circuit connections including connections from a plurality of said second series of contacts to said selector whereby the voltages at said plurality of contacts are determined by the respective connections and by the voltage derived by the selector from the respective one of said first series of contacts, an error signal lead for applying a signal to said servo motor, and command switch means for connecting said lead to one of said second series of contacts, said servo motor being responsive to the signal from said lead to displace said part and said feedback switch means being responsive to displacement of said part in the sense tending to reduce any signal induced in said lead by said command switch means.

Figure 1B:
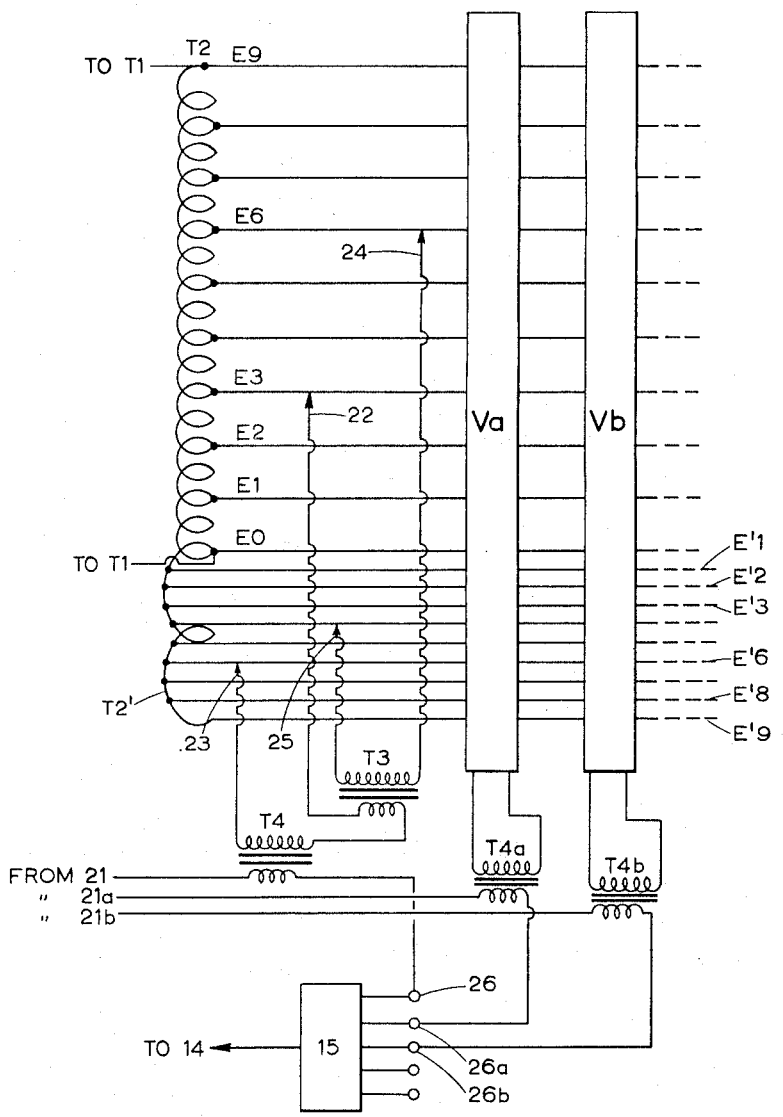
Figure 2:
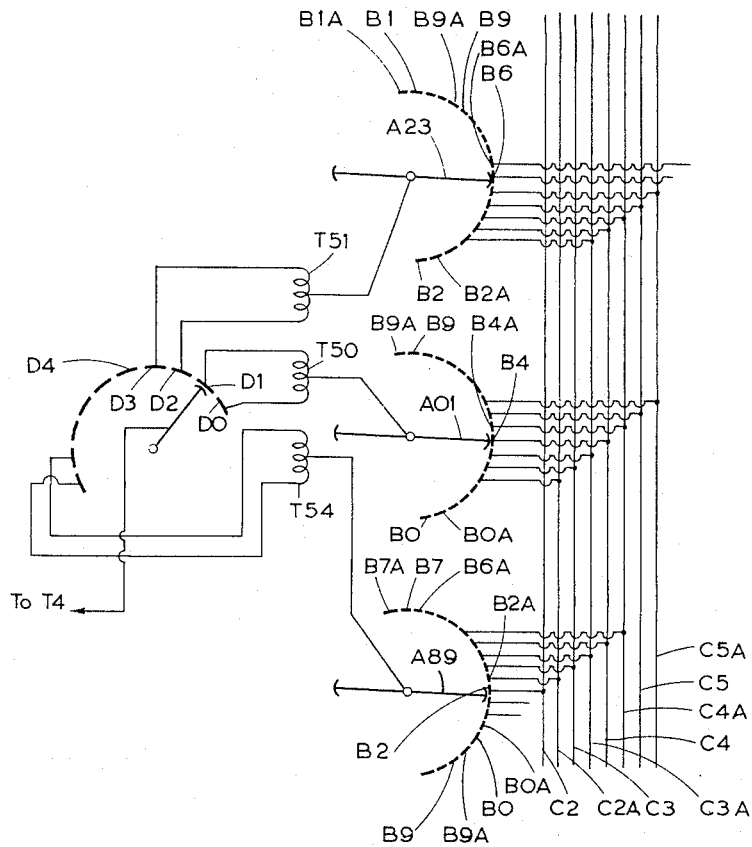

In order that the present invention may be clearly understood and readily carried into effect, the invention will now be described with reference to the accompanying drawings, in which:

FIGURES 1a and 1b illustrate parts of one example of a position control system according to the present invention, the two parts together constituting the control system, and FIGURE 2 is a detailed view of part of FIGURE 1.

Referring to FIGURES 1a and 1b the reference 1 represents a servo motor which drives a lead screw 2 the nut of which is attached to a table 3 which in the present example is the worktable for a machine tool. The lead screw 2 also drives two switches S1 and S2 which form part of a position analogue unit. The switches S1 and S2 are shown in two separate parts in the drawing to facilitate illustration, and the switch S1 comprises five wipers A01, A23 ... A89 which are mechanically coupled so as to rotate as a unit when the lead screw 2 is rotated. The wipers are shown in a straight line in the drawing but are in fact rotary wipers as will appear from the description of FIGURE 2. The wipers arranged to traverse contacts B, of which there are ten pairs, the first pair being denoted as B0 and B0A, the second pair being denoted as B1 and B1A and so on. Moreover the contact pairs B2 to B8A are connected by conductors C2 to C8A to equally spaced tapping points on an auto-transformer T1 wound on a toroidal core, the conductors being wound selectively round injector toroidal cores 4 and 5 to form secondary windings between the contacts B and the transformer T1. The toroidal cores 4 and 5 are indicated for simplicity by dotted rectangles. Furthermore the conductors C2 and C2A are connected together to one tapping point on T1, the conductors C3 and C3A are connected together to a second tapping point T1 and so on in pairs. The secondary windings on the injector toroids are all wound in the same sense. The toroids have primary windings 6 and 7, which are wound in mutually opposite senses so that there is a polarity reversal between the primary winding 7 and its secondary windings, but no polarity reversal between the primary winding 6 and its secondary windings (as seen in the drawings). The primary winding 6 has its right hand end connected to a wiper 8 and the winding 7 has its left hand end connected to a wiper 9, the wipers 8 and 9 forming part of the second switch S2 and being driven by the lead screw 2. Suitable gearing is provided between the lead screw and the wipers A of the switch S1, and also the wipers 8 and 9 of the switch S2 so that the latter wipers rotate at ten times the rate of the former. The wipers 8 and 9 of the switch S2 traverse tapping points on an auto-transformer 10 which is supplied with reference voltage from a transformer secondary winding 11 on the same core as the transformer T1. The auto-transformer 10 has a span exceeding 180°, measured in terms of the rotation of the wipers 8 and 9, and two points on the auto-transformer 10 wihch are 180° apart are connected respectively to the left hand end of the primary winding 6 and the right hand end of the primary winding 7. All the wipers A on the switch S1 are of the make-before-break type and when rotation of the lead screw causes the wipers A to traverse the contacts B, the electro-motive forces injected into the conductors C by the injecting toroids 4 and 5 are such as to cause an almost smooth variation of the potential at the contacts A, as described for example in United States patent application Serial No. 484,202.

For example assume that there is a voltage difference of 1 volt between adjacent contacts on the transformer T1, and let this difference be denoted by $\Delta V$. The number of turns on the winding 11 is then arranged so that the voltage over a 180° span of the auto-transformer 10 represents $\Delta V/2$. When the wipers A of the switch S1 and the wipers 8 and 9 of the switch S2 are in the positions shown in the drawing, a voltage of about $\Delta V/4$ is applied across the primary winding 7 (no voltage being applied across the primary winding 6) and the sense of the voltage is such that the left hand end of 7 is positive with respect to the right hand end. The voltage $\Delta V/4$ appears across the secondary winding of 5 in the conductor C4 but so that the left hand end is negative with respect to the right hand end. Therefore the voltage on the contact B4 is $\Delta V/4$ below the voltage on the tapping point of T1 to which the conductor C4 is connected. This corresponds to the wiper A01 being at the mid point of the range of positions in which it engages the contact B4. As the wiper moves from this position towards the contact B4A the wipers 8 and 9 are rotated in the direction indicated by the arrows in FIGURE 1a, whereby the voltage injected into the conductor C4 is reduced in a linear manner. At some point before the wiper A01 reaches the position midway between B4 and B4A the wiper 8 moves on to the auto-transformer. A voltage is then set up across the winding 6 which is equal to that across the winding 7 and the voltage across 6 is injected into the conductor C4A by way of the secondary winding in that conductor. There is no phase reversal between 6 and its secondary windings, and therefore although the voltage across 6 is of opposite sign to that across 7, the voltage injected into C4A is equal in magnitude and sign to that injected into C4. Therefore while the two wipers 8 and 9 are simultaneously on the auto-transformer 10 the voltages at the two contacts B4 and B4A are equal, and no discontinuity arises when the wiper A01 engages B4A before leaving B4. When eventually the wiper A01 reaches the position mid-way between the contacts B4 and B4A, the wiper 9 has by then reached the point on the auto-transformer 10 which is connected to the right hand end of 7 and so the winding 7 is short circuited and no voltage is injected into the conductor C4. Also the wiper 8 is aligned with the point on the auto-transformer which is connected to the left hand end of the primary winding 6. The winding 6 is therefor also short circuited and no voltage is injected into the conductor C4A. The contacts B4 and B4A are therefore simultaneously at voltage of the tapping point on T1 to which the conductors C4 and C4A are together connected. Further movement of the wiper A01 in the same direction is associated with the corresponding movement of the wipers 8 and 9 and the voltages across the windings 6 and 7 increase accordingly, although they have opposite signs. The voltage at the contact B4A rises linearly above that at the tapping point to which C4A is connected, and as long as the wiper 9 remains on the auto-transformer 10 the voltage at B4 remains the same as at B4A. This allows for any backlash between the switches S1 and S2. The transition between any two of the contacts B takes place in a similar manner, except that when the transition is between two contacts B, such as B4A and B5, which are connected to different tapping points on the transformer T1, the voltage set up across the primary windings 6 and 7 has its maximum value instead of zero.

The motor 1 has a field winding 12, the current in which is controlled by a power amplifier 13 which receives the output signal of a differencing circuit 14. One input to the differencing circuit is derived as shown from the mid point of T1, which may be earthed, whilst the second input to the differencing circuit is derived from an interpolating arrangement 15 (FIGURE 1b) which is shown merely in block form since it is of the construction described in United States patent application Serial No. 581,038. A tacho-generator 16 may be provided, driven by the lead screw 2 as indicated, for injecting velocity feedback to the servo motor in known manner.

As explained in the specification of the last mentioned application, the interpolation arrangement 15 requires, as input signals, voltage analogue signals which represent values of one co-ordinate of successive reference points on the locus to be described by the worktable 3, the co-ordinate being that which is varied under the control of the motor 1. The interpolation arrangement 15 has five input terminals to which analogue signals are applied for interpolation in cyclic order, the signals applied to three of the terminals being used at any one time in the interpolation to determine the span in which the interpolation is carried out. Whilst the signals applied to three of the input terminals are in use in this way, those applied to the other two input terminals can be changed in such a manner that the output from the interpolating arrangement is in the form of a virtually continuous analogue signal. Each input signal to the interpolating arrangement 15 can be set up in response to a record such as a punched tape, punched card or the like and the use of such a record implies that the signals are recorded in a digital form so that a conversion to an electrical analogue signal is required before application of the signals to the interpolating arrangement. The drawing illustrates means for setting up the analogue signals associated with three input terminals 26, 26a and 26b of the interpolating means and it is to be understood that other analogue signals required during the change over from one set of input terminals to the other are set up by similar means. An accuracy of one part in a thousand is required in the control system and the converter which is shown for applying an analogue signal to the input terminal 26 comprises five selectors 21 to 25, one corresponding to each of five decimal orders required to achieve this degree of accuracy. These selectors could in some cases be set by hand but may be moved to positions corresponding to the appropriate decimal digits in response to the record by means of uni-selectors or relays. The setting of selectors in response to a record is however no part of the present invention and will not be further described, one suitable arrangement being described for example in United States patent application Serial No. 620,145.

FIGURES 1a and 1b show the selectors 21 to 25 in positions corresponding to the dimension 13.664, and the voltage scale is such that 10 volts represent 100 inches. The most significant digit is set up by the selector 21 which in the example described makes contact with the stud D1 a series D0 to D9, to represent the digit 1. Although there are 10 studs, D, there are only 5 wipers A and the studs D are connected in pairs to corresponding wipers A by means of transformer secondary windings T50 to T54. For example the wiper A01 is connected to the mid point of the transformer winding T50 and the studs D0 and D1 are connected to the opposite ends of that winding, there is a similar connection between the other pairs of studs and the respective wipers. The windings T50 to T54 have a common primary winding T5 connected across the auto-transformer T1. All the secondary windings have the same number of turns. For example the turns ratios between the primary winding T5 and the secondary windings T50 to T54 is such that the voltages across the secondary windings are all equal to $\Delta V$. Therefore the voltage on D0 is $\Delta V/2$ below that on the wiper A01 whereas the voltage on D1 is $\Delta V/2$ above that on the wiper A01. Similarly the voltage on D2 is $\Delta V/2$ below that on the wiper A23, the voltage on D3 is $\Delta V/2$ above that on the wiper A23, and so on. The final result is therefore the same as that from the ten wipers A01, each connected directly to one of the studs D, as in the arrangement described in the United States patent application Serial Number 753,793. As will appear from consideration of FIGURE 2, the reduction of the number of wipers A by half results in the saving of five stepping switches. Although FIGURE 1a may suggest that the studs D move with the wipers A, in fact the construction of the switch S1 is such that the studs D remain stationary despite rotation of the wipers as will appear from the description of FIGURE 2 so that rotation of the wipers does not alter the stud D selected by the selector.

The selectors 22 and 24 are arranged to connect to selected bus-bars E0 to E9 leading from a transformer T2 which is connected across the same voltage source as the transformer T1. The selectors 22 and 24 are set to represent the second and fourth order decimal digits of a desired analogue value. Similarly, the selectors 23 and 25 are set to represent the third and fifth decimal digits by selection among bus-bars E0 and E'1 to E'9 leading from a transformer T2' which is a secondary winding to the transformer T2, being wound on the same core. The number of turns on T2' is predetermined so that the electro-motive force between adjacent bus-bars is 1/10 of that between adjacent bus-bars connected to T2. The transformers T3 and T4 are arranged to add (in predetermined ratio) to any voltage derived from the selector 21 the voltages between the selectors 22 and 23 on the one hand and between the selectors 24 and 25 on the other hand. The transformer T3 has a step down ratio of 100:1 and the transformer T4 has a step down ratio of 10:1. With the selectors in the positions shown the voltage across the primary winding of the transformer T3 is 6.4 volts and this voltage when stepped down to .064 volt is added across the primary winding of T4 to the voltage between the selectors 22 and 23. The latter voltage is 3.6 volts so that the voltage across the primary winding of T4 is 3.664 volts. This is now stepped down to 0.3664 volt by the transformer T4 and is added to any voltage between the selector 21 and the mid point of the transformer T1.

The most significant digits of the analogue signals applied to the terminals 26a and 26b of the interpolator arrangement 15 is derived from selectors 21a and 21b. The three wipers 21, 21a and 21b can be set individually to represent successive desired values of the displacement of table 3 in the co-ordinate direction represented by the axis of the shaft 2. The wipers 21a and 21b are connected to the secondary windings of transformers T4a and T4b whereby voltage contributions can be added representing four decimal digits of successively lower order. These contributions are set up by the system of selectors like 22 to 25 but these components are denoted for simplicity by the rectangles Va, Vb.

Assume that the interpolating arrangement 15 is interpolating within the input voltage applied to the terminals 26, 26a and 26b. The output voltage will then correspond to the ordinate of some point on a curve determined by the applied voltages. However in order to explain the operation of the arrangement it will be assumed that the output voltage of the interpolator is in fact equal to that applied to the input terminal 26 namely 1.3664. The output of the interpolator does in fact have this value at some point while it is interpolating within the span under consideration. If the table 3 is not in the position corresponding to the command signal derived from the interpolating arrangement, the output from the differencing unit 14, suitably amplified, drives the servo motor 1 and the switches S1 and S2 through their respective gearing. As a result all the wipers on the switch S1 are rotated until the wiper A01 is moved to a position which is .3664 −0.5 volt below the mid point of T1, the reduction of 0.5 volt arising because the stud D1 via $\Delta V/2$ namely 0.5 volts above whichever contact B it is connected to. In the absence of the injecting toroids 4 and 5 the contacts B4A would be held at 0.5 volt below the mid point of T1, the contacts B3 and B3A would be held at 1.5 volts below the mid-point of T1, and so on. The servo motor will therefore respond to the error signal by moving the wipers A to bring A01 into contact with B4 at such a position that S2 injects a voltage by means of the toroid 5 into the conductor C4 which causes the voltage on the contact B4 to be .3664 volt below that at the corresponding tapping point on T1. In this way the input to the differencing circuit 14 is reduced to zero, and the table 3 is brought to the position corresponding to the command signal. Similarly, if all the selectors 21 to 25 are set on the zero bus-bar, the wiper A01 would set itself exactly mid-way between B5 and B5A. The presence of the switch S2 and the connections associated with the toroids 4 and 5 results as indicated in an almost smooth variation in the potential at the contacts B as the table 3 is displaced by the servo motor 1 and this makes it possible for the wiper selected by 21 to be set with a high degree of precision in a position corresponding to the command signal. The wipers will moreover stop in the commanded position unless in the meantime the command signal in the interpolator has changed.

FIGURE 2 illustrates in greater detail a part of the switch S1 in a practical form. The wipers A01 to A89 are constituted by the wipers of a series of five multi-position rotary switches. Only three of the five switches are shown in FIGURE 2, but as indicated, all the wipers are mounted in equivalent positions in the output shaft of the switch S1, and the effect of spacing them angularly about the shaft is achieved by altering in a cyclic way the order of connection of the respective bank of contacts to the conductor C. The wipers A0 to A9 are in turn connected electrically via the secondary windings T50 to T54 to the contacts of another multi-position rotary switch comprising the contacts D0 to D9 and the selector 21. There is a separate rotary switch with contacts D0 to D9 and with its own selector for each analogue voltage required at any one time. The contacts I of all such rotary switches are connected in parallel to the wipers A. For the purposes of analysis it is convenient to regard the contacts B, the wipers A, and the contacts D and the selector 21 as a composite selector switch having an output terminal namely the selector 21. This composite switch, is operable to switch the input terminal from one reference point on the auto-transformer T1 (which functions as a potential divider) to the next in one sense to represent a variation in the command signal equivalent to 10 inches in one direction. The reference points are of course the tappings on the auto transformer to which the conductors C are connected. Furthermore, the composite switch is operable in response to the servo motor to switch the output terminal 21 from one reference point to the next on T1, but in the opposite sense to represent a corresponding variation of the variable, namely the displacement of the worktable. The analogue signal applied to the terminal 26, and similarly all the other analogue signals, do not therefore represent the displacement required of the table 3 (in the particular co-ordinate direction under consideration) with reference to any fixed datum point, but always with respect to the instantaneous displacement of the table. This of course does not affect any interpolation produced by 15, since it is equivalent merely in a shift of the respective co-ordinate of the origin of the system of axes in use.

In an example described, the auto-transformer T1 comprises a voltage divider tapped at a series of reference points and the contacts B constitute a first series of contacts connected respectively to said reference points. The wipers A01 to A89 constitute feedback switch means having a plurality of selectors, namely hte wipers themselves movable in unison in response to displacement of the worktable 3, which is the controlled part, to derive voltages respectively from the successive contacts B in the first series of contacts. The contacts D0 to D9 constitute a second series of contacts which are twice as numerous as the wipers A01 to A89. The first pair of the contacts D0 and D1 have circuit connections to the first wiper A01, the second pair of contacts D2 and D3 have circuit connections to the second wiper A23 and so on to the last wiper. The circuit conections include portions of the secondary windings T50 to T54 so that the two contacts of each pair are maintained at voltages which are equally above and below the voltage of the respective wiper. Therefore by virtue of the connections from the contacts D0 to D9 to the wipers A01 to A89 different voltages are maintained at the contacts of the second series each voltage being determined by the circuit connections and by the voltage derived by the respective wipers from the first series of contacts B0 to B9. Each selector 21 constitutes command switch means for conecting the error signal lead of the servo motor 1 to one of the second series of contacts D0 to D9, the servo motor 1 being responsive to the error signal to tend to displace the table 3 and the feedback switch means constituted by the wipers A01 to A89 being responsive to displacement of the worktable 3 in the sense tending to reduce any error signal induced by movement of the command switch means.

In the example being described a limit of 30 inches is placed on the maximum span within which the interpolator 15 may operate. For this reason connections to the contacts B having the suffices, 0, 0A, 1, 1A, 9 and 9A have been omitted. In fact the contact B0 must be disconnected from the transformer T1 to prevent the possibility of a short circuit across the transformer T1. There is no cumulative error in the control system illustrated. The switch S1 can be rotated as many times as may be desired provided only the table 3 can move far enough, each rotation representing a travel of 100 inches. There is thus no limit to the amount of travel which can be provided. Furthermore a much higher degree of accuracy can be obtained than would be possible if the command signal were required to represent the maximum possible travel within the same voltage range as that used in the example illustrated.

In the drawing a relatively simple arrangement is shown for setting up the voltage on the contacts B and in practice a more complex arrangement may be required to obtain an accuracy comparable with that indicated for the command signal.

Other injecting arrangements may be adopted for producing a smooth variation of the voltage picked up by the wipers A as the shaft 2 rotates. For example the auto-transformer 10 may be replaced by a variable linkage transformer in which the voltage applied to the windings 6 and 7 are caused to vary in a stepless manner by rotation of secondary windings relative to a primary winding. Such an arrangement is described for example in United States patent application Serial Number 484,202.

The gear ratio between the switches S1 and S2 requires to be adjusted in this case, as the secondary windings rotate at half the speed of the wipers 8 and 9. It is moreover not necessary that the wipers A move continuously and the switch S may include an impulse motor for moving the wipers A in a series of discrete steps from one contact B to the next, in timed relationship with the movements of the wipers 8 and 9, or the transformer secondary windings if a variable linkage transformer is used.

It will be understood that the number of wipers A can be still further reduced, compared with FIGURE 3, by extending the secondary windings of T5 and increasing the number of contacts connected to them. Moreover, the spacing of the wipers A need not be uniform nor do the number of tappings in the secondary windings of T5 need to be equal. Obviously moreover a decimal scale need not be used, for example, if angular co-ordinates are employed. In general of course the physical spacings of the contacts D should correspond to their electrical spacings with respect to the autotransformer T1 which is the ultimate source of reference voltage, and the electrical spacings should be equal. Furthermore one or more of the wipers A may be connected directly to a contact D or to the contacts D as the case may be, whilst other wipers A are connected via secondary winding of T5 each to more than one contact. In a limiting case there may be one contact A connected to a selected point of a single secondary winding of the transformer T5, the complete series of contacts D being then connected to taps of that secondary winding.

What I claim is:

1. An automatic control system comprising a part the displacement of which is to be controlled, a servo motor for producing displacement of said part, a voltage divider tapped at a series of reference points, a first series of contacts connected respectively to said reference points, feedback switch means including at least one selector movable in response to displacement of said part from one to another of said first series of contacts to derive voltage therefrom, a second series of contacts having circuit connections to said first switching means to maintain different voltages at the successive contacts of said second series determined by the circuit connections and by the switch means, said circuit connections including connections from a plurality of said second series of contacts to said selector whereby the voltages at said plurality of contacts are determined by the respective connections and by the voltage derived by the selector from the respective one of said first series of contacts, an error signal lead for applying a signal to said servo motor, and command switch means for connecting said lead to one of said second series of contacts, said servo motor being responsive to the signal from said lead to displace said part and said feedback switch means being responsive to displacement of said part in the sense tending to reduce any signal induced in said lead by said command switch means.

2. A control system according to claim 1, said circuit connections comprising transformer secondary winding portions connecting said plurality of contacts to said selector, and transformer primary means for inducing voltage across said secondary winding portions.

3. An automatic control system comprising a part the displacement of which is to be controlled, a servo motor for producing displacement of said part, a voltage divider tapped at a series of reference points, a first series of contacts connected respectively to said reference points, feedback switch means including a plurality of selectors movable in unison in response to displacement of said part to derive different voltages respectively from said first series of contacts, a second series of contacts comprising a first plurality of contacts having circuit connections to said first selector, a second plurality of contacts having circuit connections to the second of said selectors and so on to the last of said selectors, said circuit connections including means for maintaining different voltages at the contacts of said second series, said different voltages being determined by said circuit connections and by the voltages derived by the selectors from the respective contacts of the first series of contacts, an error signal lead for applying a signal to said servo motor, and command switch means for connecting said lead to one of said second series of contacts, said servo motor being responsive to the signal from said lead to displace said part and said feedback switch means being responsive to displacement of said part in the sense tending to reduce the signal induced in said lead by said command switch means.

4. A control system according to claim 3, said circuit connections including transformer secondary winding portions connecting the contacts of said second series to their respective selectors, and transformer primary means common to said secondary winding portions for inducing voltage across said secondary winding portions.

5. A control system according to claim 3 the contacts of said second series being twice as numerous as said selectors, and having circuit connections in pairs to the respective selectors, the circuit connections including transformer means for maintaining the contacts of each pair at voltages which are equally above and below the voltage derived by the respective selector.

6. A system according to claim 1, comprising means for injecting incremental voltages into the connections from said reference points to said first series of contacts to produce output voltages at said first series of contacts which vary relatively smoothly from the voltage at one reference point to that at another, and other means for injecting an incremental voltage into said error signal lead to represent a minor contribution to the desired displacement of said part.

7. A system according to claim 1 comprising at least one further error signal lead, and at least one further command switch means for selectively connecting said further error signal lead to one of said second series of contacts, and interpolating means for interpolating among the signals induced in said error signal leads to derive an interpolated error signal for said servo motor.

References Cited in the file of this patent

UNITED STATES PATENTS

| | | |
|---|---|---|
| 2,727,205 | Annis | Dec. 13, 1955 |
| 2,774,934 | Gitzendanner | Dec. 18, 1956 |
| 2,833,979 | Scott | May 6, 1958 |
| 2,849,668 | Tripp | Aug. 26, 1958 |